UNITED STATES PATENT OFFICE.

PLINEY IRWIN, OF WAVERLY, ASSIGNOR OF ONE-THIRD TO RUFUS M. BROWN, OF BLOOMINGDALE, MICHIGAN.

PROCESS OF PREVENTING YELLOWS IN PEACH-TREES.

SPECIFICATION forming part of Letters Patent No. 250,666, dated December 13, 1881.

Application filed August 18, 1881. (No specimens.)

*To all whom it may concern:*

Be it known that I, PLINEY IRWIN, a citizen of the United States, residing at Waverly, county of Van Buren, State of Michigan, have invented a new and useful Process of Preventing Yellows in Peach-Trees, of which the following is a specification.

My invention consists in certain preparations for the treatment of the trees and the manner of said treatment, substantially as hereinafter set forth. The quantity of the ingredients given in each preparation is designed for a single application to about one hundred trees.

To carry my invention into effect I thoroughly wash the trunk and branches of the trees with a liquid wash consisting of one ounce of carbolic acid to two gallons of rain or other water. This treatment is to loosen and soften the bark preparatory to further steps in the process, and to kill parasites and vermin which may infest the same. I then dig around the tree, exposing the upper or main roots, and make incisions in the bark thereof, into which I insert a preparation composed of one ounce tincture of iron to two drams nux vomica, by saturating the roots where the incisions are made. A sponge wet with the liquid may be employed for this purpose, or other practical means. This treatment regulates the flow of sap and assists in toning up the tree to a healthy condition. I then bury around the roots a compound of sulphur and salt, about one pound of the former to ten of the latter. This keeps the roots moist and active, destroys insects and vermin, and aids in imparting vigor to the tree.

The trees may be treated one or more times during the season, according to the condition and health of the trees and the effect of the treatment. The proper time to treat the trees is from about the 1st of May to 1st of September, preferably in June and August, during the flow of sap. If the trees are old and in very bad condition they should have more thorough attention and more frequent than young trees. The amount of the ingredients in each preparation is an approximate estimation for average trees. It will appear clear to all that as different trees vary in size and health the exact amount and proportions cannot be given in a single instance which will apply to all; hence I do not wish to be limited to the exact amounts and proportions given in the grant of my claim.

What I claim, and desire to secure by Letters Patent, is—

The process, substantially as herein described, of preventing yellows in peach-trees, which consists in washing the trees with a mixture of carbolic acid and water, in inserting in the bark of the roots tincture of iron and nux vomica, and in burying around the roots a compound of sulphur and salt.

PLINEY IRWIN.

Witnesses:
EUGENE S. WEST,
F. A. CRANDALL.